Patented Oct. 27, 1931

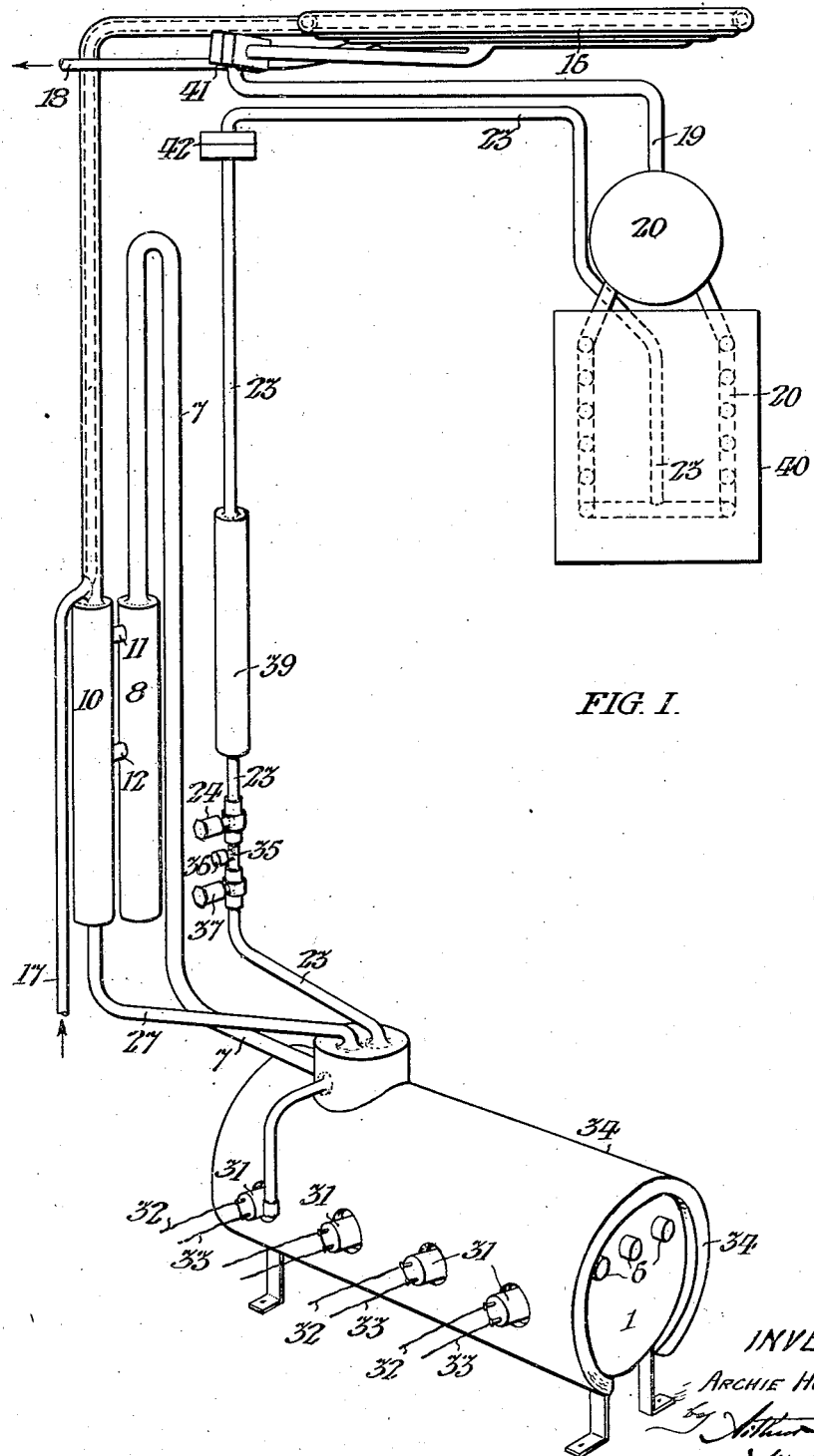
FIG. I.

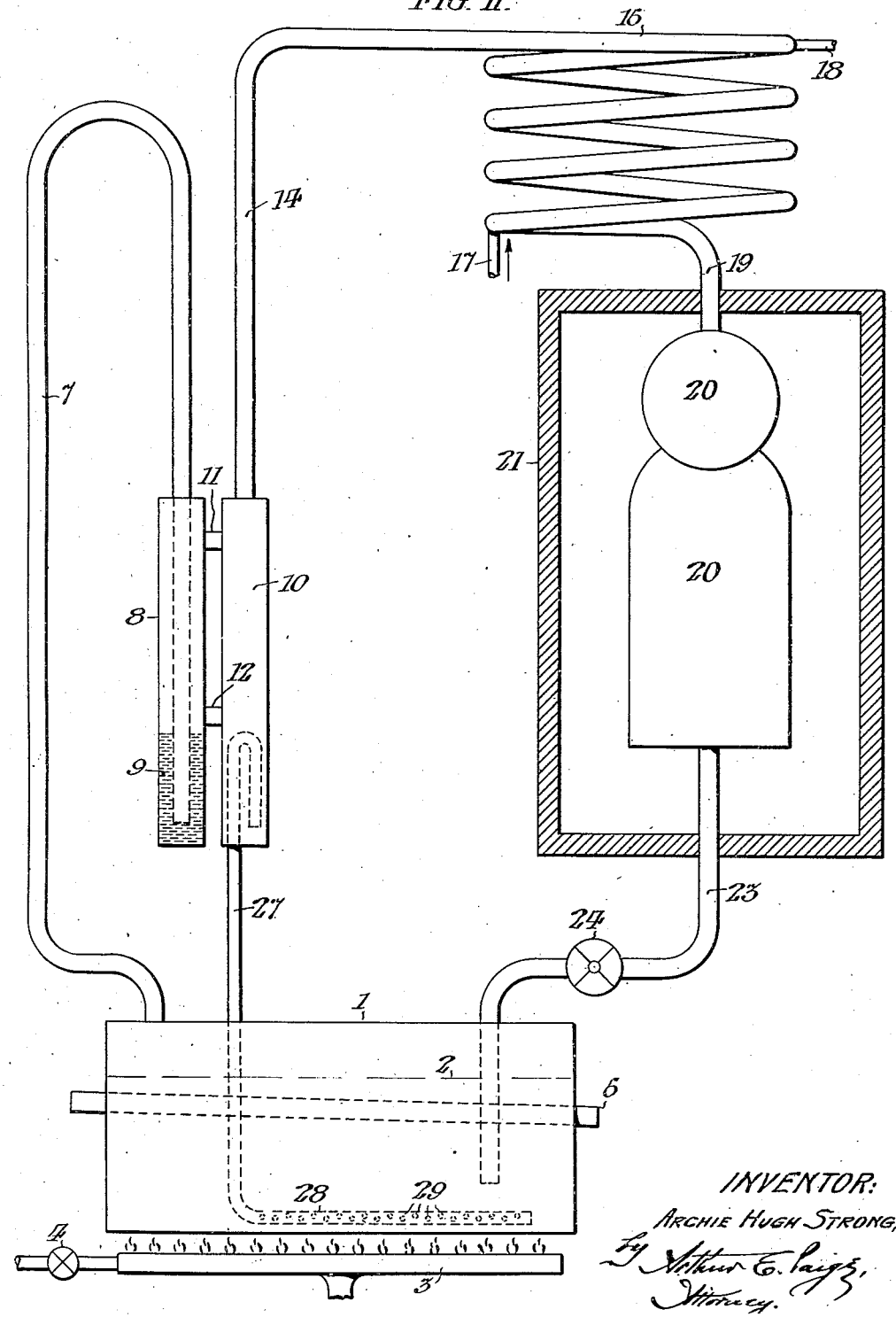

1,829,716

UNITED STATES PATENT OFFICE

ARCHIE HUGH STRONG, OF NORRISTOWN, PENNSYLVANIA, ASSIGNOR TO MASTER DOMESTIC REFRIGERATING COMPANY, INC., OF CONSHOHOCKEN, PENNSYLVANIA, A CORPORATION OF NEW YORK

REFRIGERATOR

Application filed June 11, 1929. Serial No. 370,116.

My invention is particularly adapted for use in refrigerating apparatus of the absorption type including a generator from which refrigerant gas is liberated from a liquid by the application of heat. My invention relates particularly to a portion of such apparatus in which the gas is separated from the liquid and which is hereinafter termed a rectifier.

In the form of my invention hereinafter described, such rectifier includes two chambers in communication with each other at the top thereof; the first chamber being adapted to receive the refrigerant gas directly from the generator, thru a seal of liquid in that chamber; the other chamber being a passageway for the gas not only from the generator to the condenser and evaporator, but a passageway for the return of the gas from the evaporator to the generator; the bottom of said second chamber being connected by a pipe having a perforated portion extending in the generator below the residual liquid in the latter and thru which the returned gas is segregated in bubbles in said liquid to facilitate its absorption therein.

My invention includes the various novel features of construction and arrangement hereinafter more definitely specified.

In said drawings: Fig. I is a perspective view of a convenient form of apparatus embodying my invention; the elements thereof being relatively disposed in such position as to facilitate the inclosure thereof in a refrigerator cabinet affording the maximum food space.

Fig. II is a diagram showing the schematic relation of the parts of the apparatus shown in commercial form in Fig. I.

In said figures; 1 is the generator adapted to contain a body 2 of a liquefiable fluid, for instance, aqua ammonia, from which the refrigerant ammonia gas may be liberated by heating said generator, conveniently by the gas burner 3 under control of the valve 4. After such heating period, said generator and its contents may be cooled by any suitable means, for instance, by tap water or other cooling fluid caused to circulate thru the conduit 6 which extends in and out of said generator 1. However, I prefer to use a secondary refrigerant such as alcohol or ethyl chloride as described and claimed in my copending application Serial No. 368,791, filed June 6, 1929, for Letters Patent of the United States for improvement in refrigerating systems.

During the heating portion of the cycle; the refrigerant gas is discharged from said generator 1 thru the pipe 7 into the rectifier chamber 8 thru the liquid seal 9 in the bottom of that chamber. Said rectifier chamber 8 is connected with the rectifier chamber 10, at the upper portion thereof, conveniently by transversely extending tubes 11 and 12.

The refrigerant gas, under pressure from said heated generator 1, is discharged thru the rectifier chambers 8 and 10 to the condenser 16, which may be cooled by any convenient means, for instance, by tap water circulated thru the piping 17, 18. Said gas, being thereby condensed to anhydrous liquid form, gravitates, thru pipe 19, into the evaporator 20 which is inclosed in the refrigerator cabinet 21. Refrigeration takes place by evaporation of the refrigerant from the liquid to the gaseous state in said evaporator 20 when the generator 1 is cooled. The pipe 23 extends from the bottom of the evaporator 20 into the generator 1 beneath the residual aqua ammonia 2 therein for the purpose of returning to the generator from time to time any aqua ammonia accumulating in the bottom of the evaporator. Said pipe 23 is preferably controlled by the valve 24 which may be kept very slightly open, or shut as hereinafter described.

During the cooling portion of the cycle of operation of said generator 1; the vaporized refrigerant returns from the evaporator 20 thru the condenser 16 and pipe 14 to the rectifier chamber 10 and thence to the generator 1 thru the pipe 27 which has a horizontal portion 28 extending in the generator near the bottom thereof and having perforations 29 thru which the refrigerant vapor is segregated and bubbles up thru the aqua ammonia 2 and is reabsorbed in the latter. As shown in Fig. II; said pipe 27 is preferably shaped and adapted to operate as a siphon.

The refrigerant vapor cannot return to the generator 1 by the pipe 7 because of the presence of the aqua ammonia seal 9 in the rectifier chamber 8 which builds up a head pressure, by rising in said pipe 7, sufficient to overcome the friction of the vapor returning by the pipe 27. Moreover, during the heating, generating, cycle, the refrigerant gas cannot ascend the pipe 27 and enter the chamber 10 of the rectifier because of the head pressure which is built up by the liquid 2 rising in said pipe 27 and which is greater than the friction thru the pipe 7 and the seal 9 in the bottom of the chamber 8. Consequently, the refrigerant gas is compelled to pass outwardly from the generator 1 thru the pipe 7 and to return to said generator thru the pipe 27; being rectified during its discharge from said generator by depositing in the chamber 8 any water primarily entrained therein, which water maintains the seal 9. Any excess aqua ammonia accumulating in said chamber 8, beyond that desired for the seal 9, passes thru the connecting conduit 12 into the chamber 10 and is returned to the generator 1 thru the pipe 27 during the succeeding cooling period.

Altho I find it convenient to employ the aqua ammonia deposited in said chamber 8 as the seal 9; any other suitable liquid may be employed for such seal; for instance, a body of mercury.

Said generator 1 may be heated by electrical energy, instead of by said gas burner 3. For instance, as indicated in Fig. I; by several resistance units 31 supplied with energy thru conductors 32 and 33. 34 indicates a heat insulating cover for said generator. Moreover, I find it convenient to provide said pipe 23 with a branch 35 thru which the aqua ammonia may be introduced and discharged when desired; said branch being normally closed by the cap 36. I also prefer to provide such branch between the valve 24 and a similar valve 37 which is adapted to control said pipe 23 but which is normally open; so that both of said valves 24 and 37 may be closed to prevent escape of the refrigerant from the apparatus while the branch 35 is opened and connections made thereto from a supply of ammonia. After such connection is made, and during the charging operation, either or both of said valves 24 and 37 may be open. However, either of said valves 24 and 37 may be closed and said branch 35 opened to sample the contents of the system, either above or below said branch. Furthermore, said valve 24 may be kept closed during the continued refrigerating operation of the apparatus if the extent thereof above said valve is of sufficient capacity to permit the alternate condensation therein and evaporation therefrom of such aqua ammonia as may find its way to the bottom of the coils of the evaporator 20 at intervals in the refrigerating cycle.

In Fig. I, I have indicated an enlargement 39 in said pipe 23 which serves as a receiver of ample capacity for such temporary deposit of liquid in said pipe, in apparatus of the proportions shown in that figure.

I find it convenient to incase the coils of the evaporator in a tank 40 which may be charged with brine to facilitate the refrigerating operation.

In order to minimize the possibility of leakage of the refrigerant from the apparatus above described, it would be preferable to weld all of the joints thereof. However, to facilitate the introduction of the apparatus to a refrigerating cabinet; it is desirable to have the evaporator 20 and its appurtenances separably connected with the remainder of the apparatus. Therefore, as indicated in Fig. I, I provide the pipes 19 and 23 with couplings 41 and 42 which are separable to facilitate such installation of the apparatus.

Altho I find it convenient to arrange the parts of the apparatus for commercial use in the form shown in Fig. I; it is to be understood that they may be otherwise constructed and arranged, for instance, as shown in Fig. II. Therefore, I do not desire to limit myself to the precise details of construction, arrangement, or method of operation herein set forth, as it is obvious that various modifications may be made therein without departing from the essential features of my invention, as defined in the appended claims.

I claim:

1. In a refrigerator of the absorption type; the combination with a generator, a condenser and an evaporator; of means adapted to alternately heat and cool said generator; conduit means connecting said generator with said evaporator, thru said condenser; a rectifier in said conduit, between said generator and said condenser, and including two chambers, separated at their lower portions, but communicating at their upper portions; a liquid seal in the rectifier chamber next to said generator, adapted to permit the flow of refrigerant gas from that chamber to the other rectifier chamber, but to prevent back flow of the refrigerant past said seal; a conduit adapted to discharge liquid from the bottom of said other chamber, and extending from the bottom of the second rectifier chamber, into said generator, beneath the residual liquid in said generator, and having a plurality of perforations adapted to segregate in bubbles in that liquid, the refrigerant gas returned to said generator from said evaporator, thru said second chamber.

2. Apparatus as in claim 1; including a liquid conduit extending from the bottom of said evaporator, into said generator; adapted to discharge liquid from said evaporator into said generator, solely by gravity.

3. Apparatus as in claim 1; including a liquid conduit, adapted to discharge liquid from said evaporator into said generator, solely by gravity, extending from the bottom of said evaporator, directly into said generator; whereby liquid may be discharged from said evaporator into said generator, without interfering with the passage of vapor from said generator to said condenser and a valve in the latter conduit, determining the effective area thereof.

4. In a refrigerator, a rectifier for a liquefiable refrigerant fluid; including two chambers, separated at their lower portions, but communicating at their upper portions; a liquid seal in the lower portion of one of said chambers; an inlet for said refrigerant fluid, controlled by said seal; and an outlet in the lower portion of the other chamber; whereby the seal liquid is detained in but one of said chambers, and eliminated from the other of said chambers.

5. Apparatus as in claim 4; including separate conduits connecting said inlet and said outlet with a generator.

6. Apparatus as in claim 4; including separate conduits connecting said inlet and said outlet with a generator, respectively above and below the liquid level therein.

7. Apparatus as in claim 1; wherein the liquid conduit extending from the bottom of the second rectifier chamber into the generator is shaped and adapted to operate as a siphon.

In testimony whereof, I have hereunto signed my name at Conshohocken, Pennsylvania, this fourth day of June, 1929.

ARCHIE HUGH STRONG.